(12) United States Patent
Schiefele (10) Patent No.: US 6,457,977 B1
(45) Date of Patent: Oct. 1, 2002

(54) INTERNAL-COMBUSTION ENGINE INSTRUCTIONAL KIT

(76) Inventor: Walter P. Schiefele, 1362 Damask La., Sebastian, FL (US) 32958

(*) Notice: Subject to any disclaimer, the term of this patent is extended or adjusted under 35 U.S.C. 154(b) by 18 days.

(21) Appl. No.: 09/753,732

(22) Filed: Jan. 2, 2001

(51) Int. Cl.[7] ............................................... G09B 25/00
(52) U.S. Cl. ...................... 434/389; 434/373; 434/401; 434/365
(58) Field of Search ................................ 434/389, 373, 434/365, 401

(56) References Cited

U.S. PATENT DOCUMENTS

| | | | |
|---|---|---|---|
| 2,166,818 A | * 7/1938 | Miceli | 40/139 |
| 2,639,544 A | * 7/1948 | Coffin | 46/39 |
| 2,629,941 A | * 7/1950 | Allgaier | 35/13 |

* cited by examiner

*Primary Examiner*—Derris H. Banks
*Assistant Examiner*—George F Hufnagel
(74) *Attorney, Agent, or Firm*—Robert E. Malm (57) ABSTRACT

The invention is an apparatus consisting of a set of parts that can be assembled into a variety of internal-combustion engine analogs. The set of parts comprises a set of platform parts that can be assembled into a platform having a platform rotary axis and a platform reference axis normal to the platform rotary axis and a set of driver parts that can be assembled with a set of platform parts into a driver assembly supported by the platform. The driver assembly comprises one or more drivers, each driver containing a first driver point and a second driver point. The first driver point travels back and forth along a driver line segment while the second driver point travels in a driver circle around a driver-assembly rotary axis.

19 Claims, 5 Drawing Sheets

Fig. 12

INTERNAL-COMBUSTION ENGINE INSTRUCTIONAL KIT

CROSS-REFERENCE TO RELATED APPLICATIONS (Not applicable)

STATEMENT REGARDING FEDERALLY SPONSORED RESEARCH AND DEVELOPMENT (Not applicable)

BACKGROUND OF THE INVENTION

This invention relates generally to instructional model kits that consist of parts that can be assembled by a user into an operational machine that serves to illustrate the operating principles of the machine. More specifically, this invention pertains to instructional model kits that are focused on the principles of operation of internal-combustion engines.

An internal-combustion engine is an engine that employs the reciprocating motion of one or more pistons in cylinders. Such engines are the predominant source of power for motorized ground transport and yet the principles of operation of such engines are a mystery to most people. As a teaching tool, there is no substitute for an operating model. Unfortunately, the complexity of the internal-combustion engine, typically involving the controlled combustion of carbon-based gaseous fuels, does not lend itself to an illustration of operating principles by a model. Thus, a student, wishing to learn about internal-combustion engines, never has the opportunity of observing the motions and interactions of the parts of such engines as the engines operate.

The present invention helps to satisfy this instructional need by providing an instructional model kit based on an analog of an internal-combustion engine.

BRIEF SUMMARY OF THE INVENTION

The invention is an apparatus consisting of a set of parts that can be assembled into a variety of internal-combustion engine analogs. The set of parts comprises a set of platform parts that can be assembled into a platform having a platform rotary axis and a platform reference axis normal to the platform rotary axis and a set of driver parts that can be assembled with a set of platform parts into a driver assembly supported by the platform. The driver assembly comprises one or more drivers, each driver containing a first driver point and a second driver point. The first driver point travels back and forth along a driver line segment while the second driver point travels in a driver circle around a driver-assembly rotary axis. The orientation of the driver is described by a driver reference axis normal to the driver-assembly rotary axis and parallel to the driver line segment. The driver-assembly rotary axis is collinear with the platform rotary axis. The driver reference axis of each driver is at any one of a plurality of angular positions relative to the platform reference axis.

DETAILED DESCRIPTION OF THE INVENTION

The internal-combustion engine instructional kit that is the subject matter of this invention is a set of parts from which an operating analog of an internal-combustion engine can be assembled. Various configurations of an internal-combustion engine can be assembled from the same set of parts. The options available include engines with any number of cylinders of practical interest and cylinder configurations that include inline, opposed, and V-type.

The assembled engine model is an electrical analog of an internal-combustion engine with electrical energy substituted for the chemical energy of gasoline, propane, natural gas, or diesel fuel that are the typical fuels used for internal-combustion engines. The analog of the internal-combustion engine piston and cylinder is a solenoid and plunger, the plunger traveling in and out of the solenoid. Just as the combustion of gas in an internal-combustion engine cylinder causes the piston to slide away from the combustion region, the application of power to a solenoid causes the plunger to slide into the solenoid.

Figure 1:
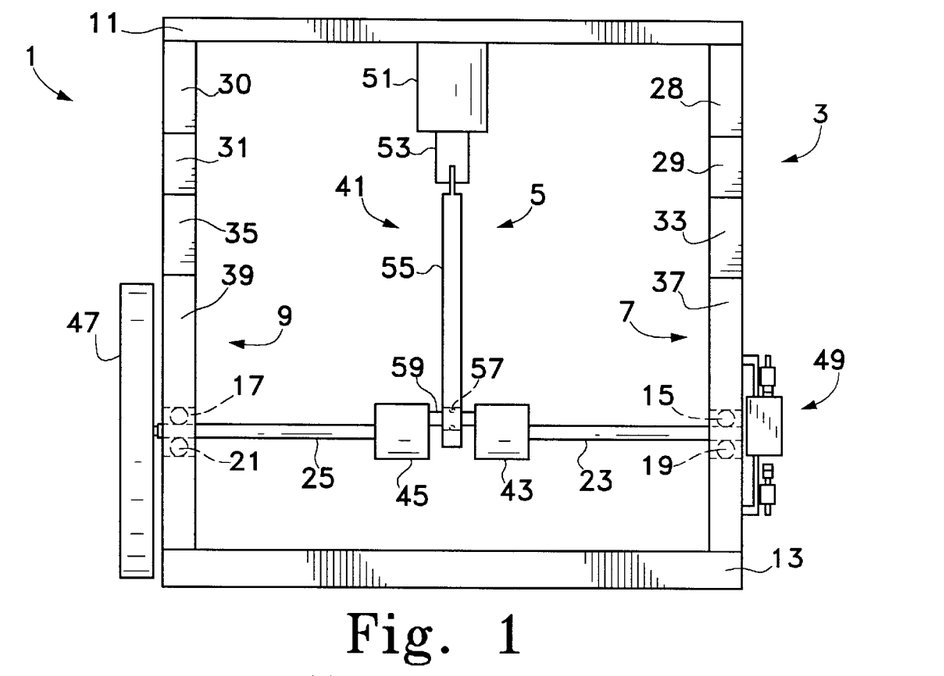
FIG. 1 is a side view of a 1-cylinder internal-combustion engine analog assembled from the internal-combustion engine instructional kit.
Figure 2:
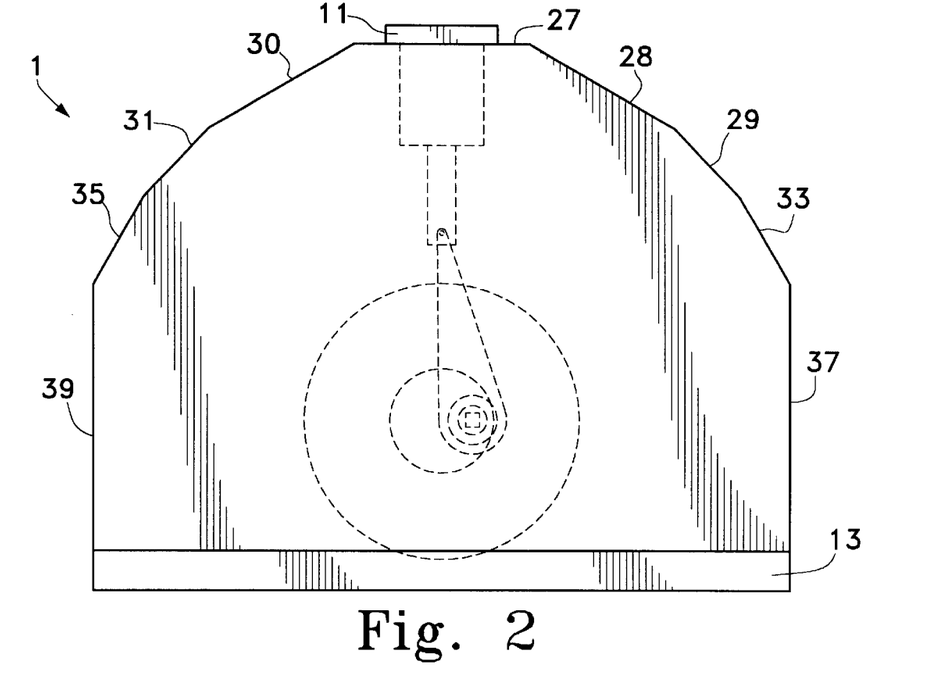
FIG. 2 is an end view of the 1-cylinder internal-combustion engine analog of FIG. 1.

The instructional kit assembled as 1-cylinder engine analog 1 is shown in side view in FIG. 1 and in end view in FIG. 2. The 1-cylinder engine analog 1 consists of platform 3 and driver assembly 5.

Platform 3 consists of three essential elements: endpin supports 7 and 9 and solenoid support 11 that attaches to the endpin supports. In addition, baseplate 13, a non-essential element, is provided in this embodiment of the invention for structural rigidity. Baseplate 13 is non-essential in that the necessary structural rigidity of platform 3 can be achieved by the appropriate design of endpin supports 7 and 9 and solenoid support 11 through the use of interlocking and bracing techniques described in readily-available mechanical design handbooks.

In order to realize the educational benefits of the invention, it must be possible to easily assemble and disassemble the parts. For this reason, reversible fasteners are used in attaching solenoid support 11 to endpin supports 7 and 9. If platform 3 is made of aluminum or steel, machine screws and tapped holes might be used. If platform 3 is made of plastic, nuts and bolts might be used or the plastic parts can be designed to have mating features that snap together into a rigid structure.

To avoid the time-consuming nature of using screw-type fasteners to assemble an engine analog, one can use trunk-type fasteners in which a loop is hooked over a catch and then secured by means of a toggle linkage.

Endpin supports 7, 9 have endpin holes 15, 17 which can accept endpin bearings 19, 21 which can in turn accept endpins 23, 25. The axes of endpin holes 15, 17 are collinear and establish the platform rotary axis after the platform 3 is assembled. The axes of endpins 23, 25 are collinear and establish the driver-assembly rotary axis when the driver assembly 5 is assembled. The platform rotary axis and the driver-assembly rotary axis are collinear when engine analog 1 is assembled.

The solenoid support 11 is shown attached to inline surface 27 of endpin support 7 and to the corresponding surface of endpin support 9 in FIGS. 1 and 2. The normal to inline surface 27 of endpin support 7 that passes through the axis of the endpin hole 15 (or the similarly defined normal for endpin support 9) is called the platform reference axis.

The assembly of a 10-cylinder engine analog in a "V" configuration (V10 configuration) requires two solenoid supports attached to V10 surfaces 28, 30 of endpin support 7 and to corresponding surfaces of endpin support 9. The normals to V-8 surfaces 28, 30 make angles of 36 degrees with respect to the platform reference axis and 72 degrees with respect to each other. Five solenoids are attached to each of the two solenoid supports.

The assembly of an 8-cylinder engine analog in a "V" configuration (V8 configuration) requires two solenoid supports attached to V8 surfaces 29, 31 of endpin support 7 and to corresponding surfaces of endpin support 9. The normals to V-8 surfaces 29, 31 make angles of 45 degrees with respect to the platform reference axis and 90 degrees with respect to each other. Four solenoids are attached to each of the two solenoid supports.

The assembly of a 6-cylinder engine analog in a "V" configuration (V6 configuration) requires two solenoid supports attached to V6 surfaces 33, 35 of endpin support 7 and to corresponding surfaces of endpin support 9. The normals to V6 surfaces 33, 35 make angles of 60 degrees with respect to the platform reference axis and 120 degrees with respect to each other. Three solenoids are attached to each of the two solenoid supports.

The assembly of a 4-cylinder engine analog in an opposed configuration requires two solenoid supports attached to opposed surfaces 37, 39 of endpin support 7 and to corresponding surfaces of endpin support 9. The normals to opposed surfaces 37, 39 make angles of 90 degrees with respect to the platform reference axis and 180 degrees with respect to each other. Two solenoids are attached to each of the two solenoid supports.

The 1-cylinder engine analog 1 shown in FIGS. 1 and 2 includes driver assembly 5 consisting of driver 41, endpins 23, 25, endpin connectors 43, 45, flywheel 47, and distributor 49.

Figures 4, 5:
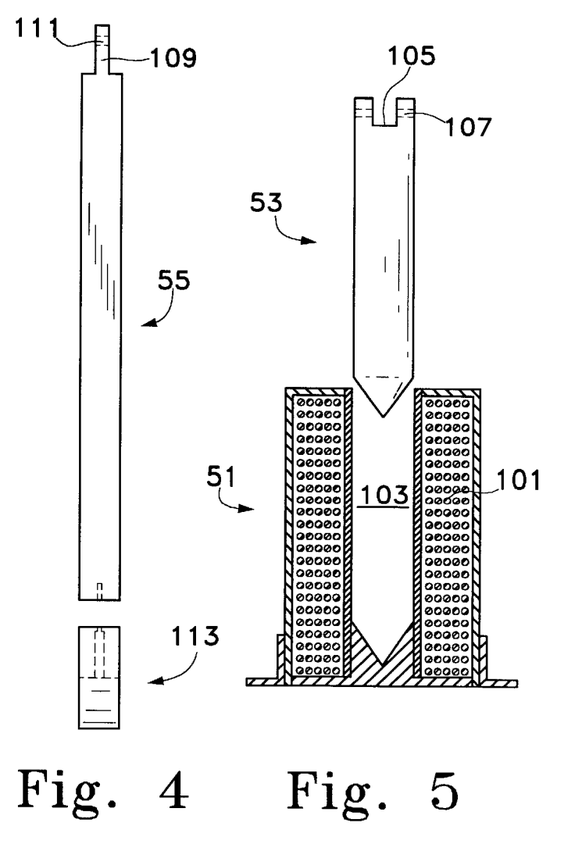
FIG. 4 is a side view of the connecting rod of FIG. 3.
FIG. 5 is a cross-sectional view of a solenoid with a plunger poised to enter the solenoid.

Driver 41 includes solenoid 51 and plunger 53 that is free to slide in and out of the solenoid. A more detailed view of solenoid 51 and plunger 53, poised to enter the solenoid, is shown in FIG. 5. Solenoid 51 comprises wire coil 101 which surrounds cylindrical region 103. When electrical power is applied to wire coil 101, a magnetic field is created in region 103 which attracts plunger 53 which is made, either wholly or in part, of a magnetic material. The attractive force on plunger 53 exerted by the magnetic field of wire coil 101 causes plunger 53 to move into region 103. Plunger 53 is constrained to remain in region 103 until power is removed from wire coil 101 and the magnetic field disappears. With power removed from wire coil 101, plunger 53 will remain within region 103 until an external force applied to plunger 53 causes plunger 53 to move out of region 103.

The solenoid-plunger configuration shown in FIG. 5 is only one of a number of possible configurations that might be used in implementing this invention. For example, if region 103 were to be open at both ends, the application of electrical power to wire coil 101 would cause plunger 53 to enter region 103 at which time the application of power would be discontinued. The momentum of plunger 53 would carry the plunger out of region 103 at the lower end at which time power would once again be applied to wire coil 101. Plunger 53 would then reverse direction and be pulled into the solenoid. Application of power would again be discontinued and the momentum of the plunger would carry the plunger out of region 103 at the top end and once again occupy the position shown in FIG. 5. Thus, with this approach, power would be applied twice per cycle in moving plunger through its rectilinear motion cycle.

A somewhat similar result can be achieved with plunger 53 being a permanent magnet. Application of power of a particular polarity would then pull plunger 53 into region 103 and the reversal of polarity would push plunger 53 out.

The combination of solenoid 51 and plunger 53 together with a means for applying electrical power to the solenoid is a mechanism for generating rectilinear motion just as the combination of a cylinder and piston together with a means for bringing about internal combustion in the cylinder of an internal-combustion engine is such a mechanism.

Driver 41 also includes connecting rod 55, crankpin bearing 57, and crankpin 59. Connecting rod 55 is shown in more detail in FIGS. 3 and 4. One end 109 of connecting rod 55 is dimensioned to fit within slot 105 of plunger 53 (FIG. 5) and permit the alignment of hole 111 in end 109 of connecting rod 55 with hole 107 in plunger 53. Thus, the design of plunger 53 and connecting rod 55 facilitate the pivotable attachment of the connecting rod to the plunger by means of a pin extending through holes 107 and 111.

Figure 3:
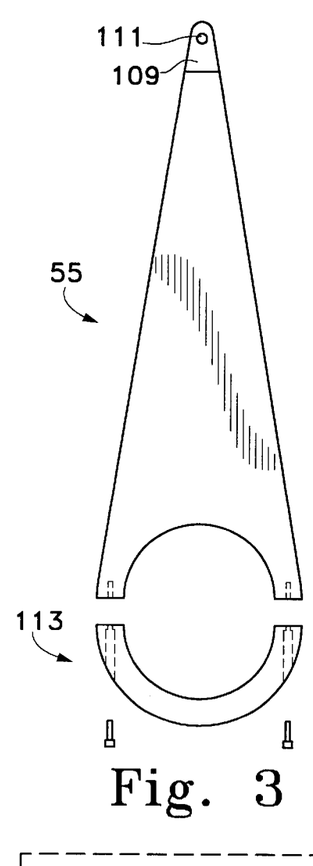
FIG. 3 is a front view of a connecting rod.

The other end 113 of connecting rod 55 provides a means for clamping bearing 57 in a fixed position relative to connecting rod 55. Bearing 57 provides the means for rotatably attaching crankpin 59 to connecting rod 55. The crankpin 59 axis of rotation is the axis within crankpin 59 that is collinear with the axis of bearing 57.

Just as a connecting rod and crankpin in an internal-combustion engine converts the reciprocating motion of a piston into rotary motion of a crankpin, connecting rod 55 and crankpin 59 convert the reciprocating motion of plunger 53 into rotary motion of the crankpin.

The conversion of the reciprocating motion of plunger 53 into rotary motion of the axis of crankpin 59 assumes that the axis of crankpin 59 is constrained to rotate about the driver-assembly rotary axis which corresponds to the axis of rotation of endpins 23 and 25. This constraint is a result of the connection of crankpin 59 to endpins 23, 25 by means of endpin connectors 43, 45.

Figures 6, 7, 8:
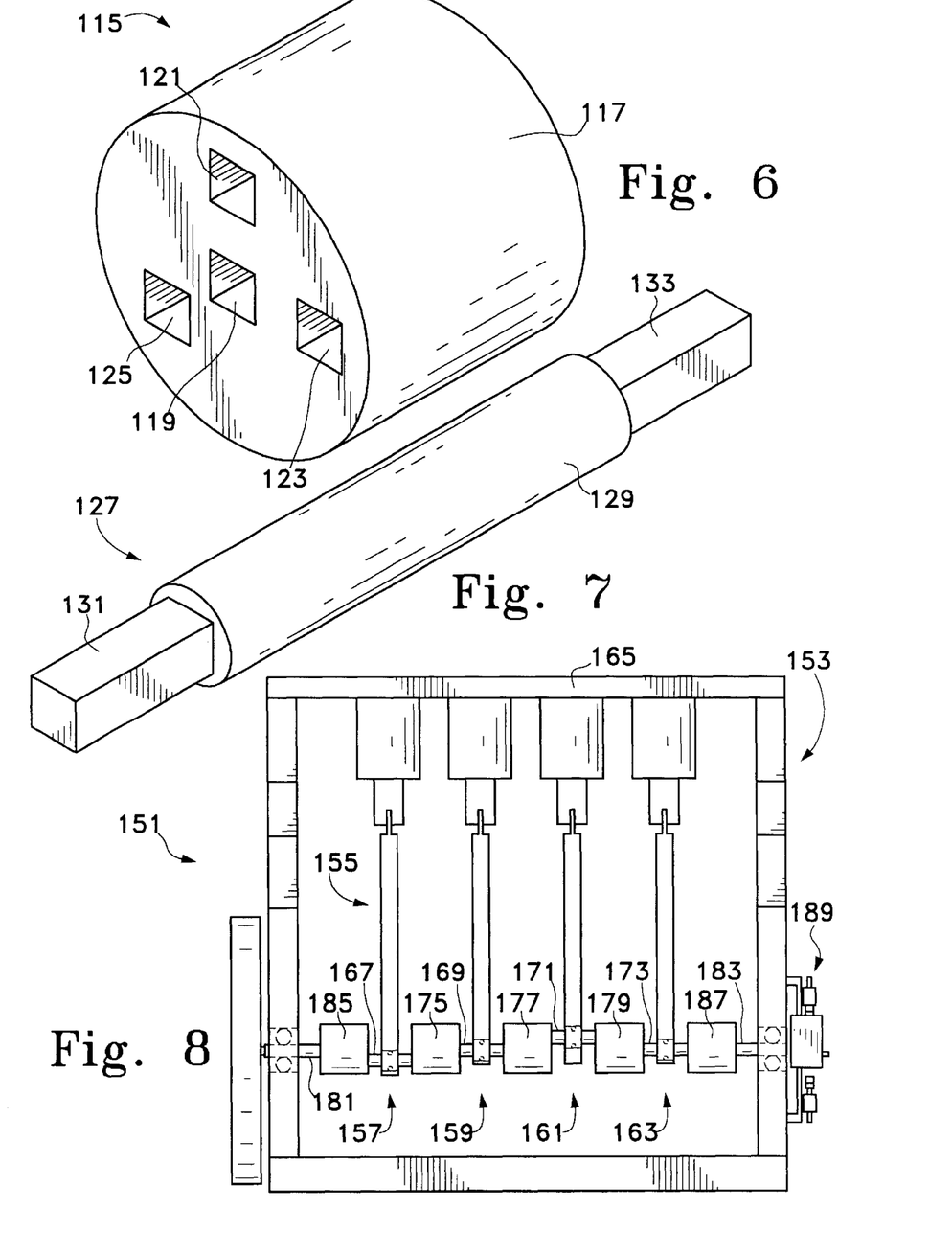
FIG. 6 is a perspective view of combination crankpin/endpin connector.
FIG. 7 is a perspective view of combination crankpin/endpin.
FIG. 8 is a side view of a 4-cylinder inline-configuration internal-combustion engine analog assembled from the internal-combustion engine instructional kit.

A combination connector 115 that can serve either as an endpin connector or a crankpin connector (discussed below) is shown in FIG. 6. The combination connector 115 comprises a cylindrical connector body 117 having a plurality of square holes: namely center hole 119, reference hole 121, 90-degree hole 123, and 120-degree hole 125. The axis of center hole 119 is collinear with the axis of connector body 117 while holes 121, 123, 125 have axes on a circle concentric with the axis of connector body 117.

Endpins and crankpins can share a common design 127 consisting of cylindrical crankpin/endpin body 129 and square ends 131, 133. The only difference between endpins and crankpins is the length of crankpin/endpin body 129. Endpins of various lengths are included in the parts kit so that a variety of engine configurations can be assembled within the same platform. Crankpins can all be of the same length although they too can be of various lengths to permit the assembled driver assemblies to be as compact as possible.

An endpin connector utilizes the center hole 119 and one of the offset holes 121, 123, 125 to connect an endpin to a crankpin. The endpin is introduced into the center hole 119 and the crankpin is introduced into one of the offset holes 121, 123, 125. For maximum rigidity of the endpin-connector-crankpin assembly, the lengths of the square ends 131, 133 should be the same as the length of the connector body 117.

Separate endpin connectors and crankpin connectors can be substituted for the combination connector 115. The endpin connector would have only the center hole 119 and one of the offset holes 121, 123, 125. The crankpin connector would have only the offset holes 121, 123, 125.

Combination connector 115 provides for the connection of crankpins with angular displacements of 90 degrees and 120 degrees or multiples thereof. Combination or crankpin connectors permitting other angular displacements and enabling the assembly of an even more diverse range of internal-combustion engine analogs could, of course, be provided in an engine instructional kit.

The axis of rotation of crankpin 59 travels around a complete circle each time plunger 53 performs a complete in-and-out cycle with respect to solenoid 51 (see FIGS. 1 and 2). Let us assume that the crankpin of a first driver has its square end in reference hole 121 of crankpin connector 115 (see FIG. 6). Let us also assume that the crankpin of a second driver is connected to the crankpin of the first driver by having its square end in 90-degree hole 123 of the same crankpin connector 115. As the crankpins of the first and second drivers rotate about the platform rotary axis, the rotation of the crankpin of the second driver will either be advanced or delayed by one-quarter cycle relative to the crankpin of the first driver, depending on the orientation of the crankpin connector 115. The one-quarter cycle advance or delay results from the 90-degree angular displacement of holes 121 and 123.

Similarly, if the crankpin of a first driver has its square end in reference hole 121 of crankpin connector 115 and the crankpin of a second driver is connected to the crankpin of the first driver by having its square end in 120-degree hole 125 of the same crankpin connector 115, then the rotation of the crankpin of the second driver will either be advanced or delayed by one-third cycle relative to the crankpin of the first driver, depending on the orientation of the crankpin connector 115. The one-third cycle advance or delay results from the 120-degree angular displacement of offset holes 121 and 125.

Driver assembly 5 also includes endpin 23 which is connected through endpin connector 43 to crankpin 59 and endpin 25 which is connected through endpin connector 45 to crankpin 59. The combination of crankpins, crankpin connectors, and endpins correspond to the crankshaft of an internal-combustion engine. The conversion of the rectilinear motion of plungers into the rotary motion of crankpins is manifested in the rotary motion of the endpins which provide the output power of the engine.

The torque applied by the solenoids through the plungers to the endpins is intermittent. In order to provide a reasonably-level power output from the endpins, driver assembly 5 includes flywheel 47 which provides a means for storing energy at power maximums and supplying energy at power minimums as the power available from the rectilinear motion of the plungers goes through peaks and valleys.

Driver assembly 5 also includes distributor 49 (FIG. 1) which controls the application of power to solenoid 51.

The instructional kit assembled as a 4-cylinder inline engine analog 151 is shown in FIG. 8. The 4-cylinder inline engine analog 151 consists of a platform 153 and driver assembly 155. The platform 153 is the same as platform 1 described above with reference to FIGS. 1 and 2. The driver assembly 155 consists of four drivers 157, 159, 161, 163 mounted on solenoid support 165. Each driver 157, 159, 161, 163 is essentially a duplicate of driver 41 of FIG. 1.

Endpin 181 is connected to driver 157 by inserting endpin 181 into center hole 119 and crankpin 167 into reference hole 121 with endpin connector 185 having the orientation of combination connector 115 (FIG. 6) rotated clockwise about center hole 119 by 180 degrees.

Driver 157 can be connected to driver 159 by inserting crankpin 167 into reference hole 121 and crankpin 169 into 90-degree hole 123 with crankpin connector 175 having the orientation of combination connector 115 (FIG. 6) rotated clockwise about center hole 119 by 180 degrees.

Driver 159 can be connected to driver 161 by inserting crankpin 169 into reference hole 121 and crankpin 171 into 90-degree hole 123 with crankpin connector 175 having the orientation of combination connector 115 (FIG. 6) rotated counterclockwise about center hole 119 by 90 degrees.

Driver 161 can be connected to driver 163 by inserting crankpin 171 into reference hole 121 and crankpin 173 into 90-degree hole 123 with crankpin connector 175 having the orientation of combination connector 115 (FIG. 6).

Driver 163 is connected to endpin 183 by inserting crankpin 173 into 90-degree hole 123 and endpin 183 into center hole 119 with endpin connector 187 having the orientation of combination connector 115 (FIG. 6).

Figure 9:
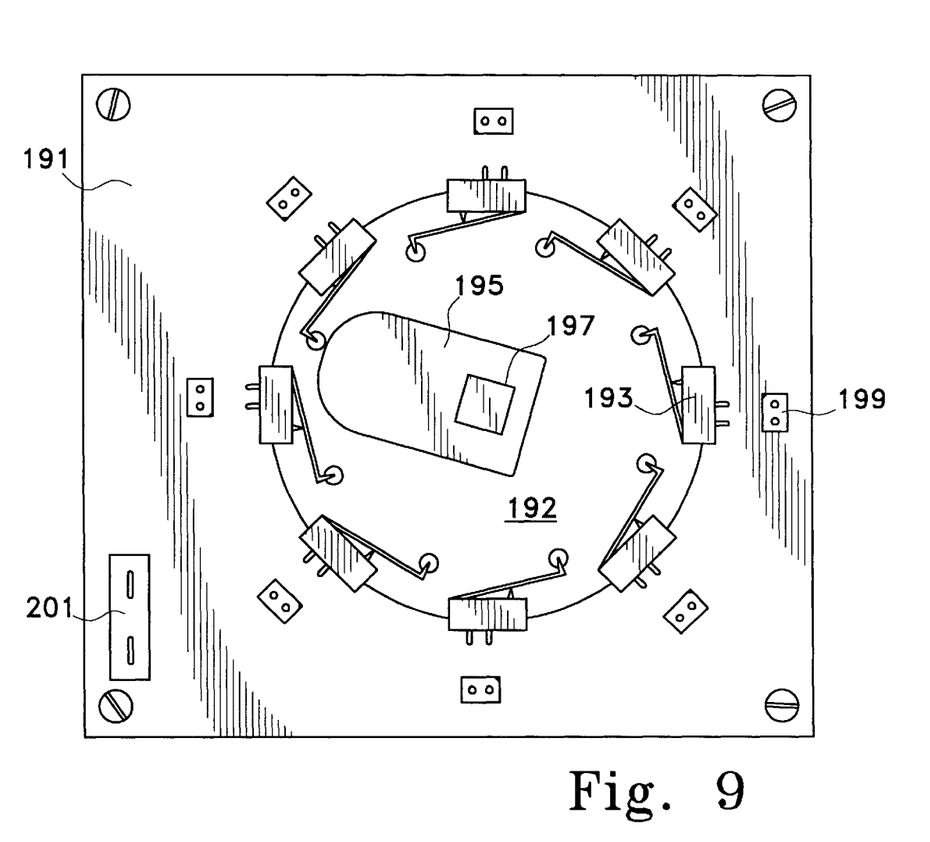
FIG. 9 is a top view of a distributor based on 45-degree angular timing.
Figure 10:
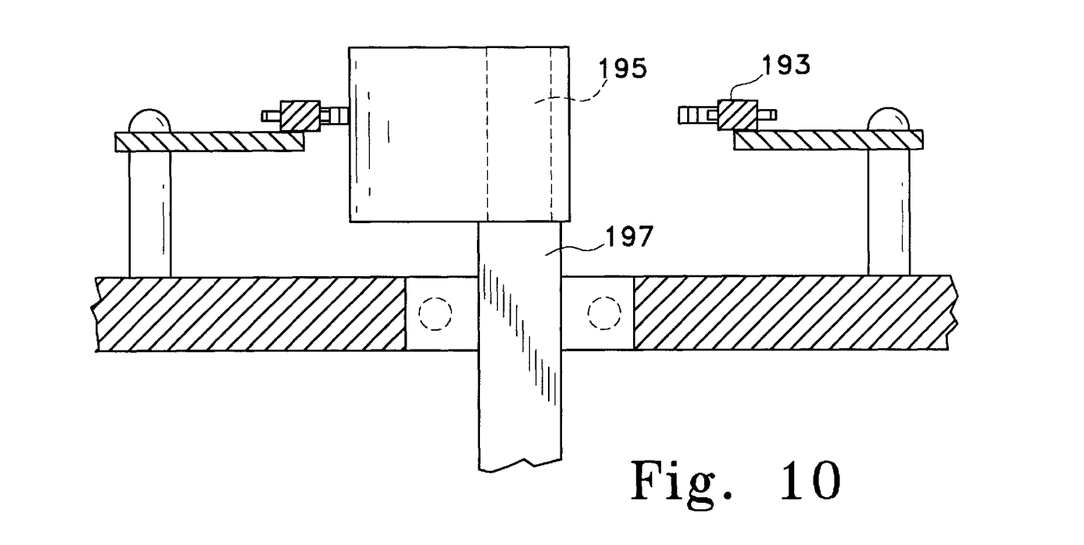
FIG. 10 is a side view of the distributor of FIG. 9.

End and side views of distributor 189 (which is suitable for 1-cylinder, 2-cylinder. 4-cylinder, and 8-cylinder engine analogs) are shown respectively in FIGS. 9 and 10. Mounting plate 191 having a circular opening 192 attaches to an endpin support in such a way that the circular opening is concentric with the platform rotary axis. Eight microswitches exemplified by microswitch 193 are mounted at intervals of 45 degrees around the circular opening 192 of the mounting plate 191. A cam 195 mounts to endpin 197 of a driver assembly. As endpin 197 rotates, cam 195 sequentially causes each microswitch to close and then open during a 45-degree angle of rotation of the endpin 197. Each microswitch, exemplified by microswitch 193, is electrically connected to a jack, exemplified by jack 199, to which a mating plug, electrically connectable to a solenoid, can be connected. Receptacle 201 provides the means for introducing the electrical power needed to power an engine analog.

Figure 11:
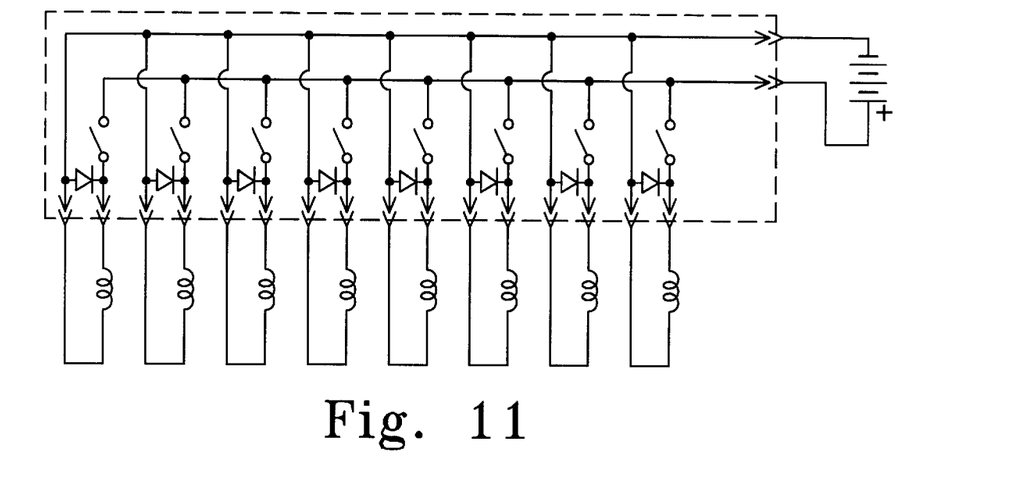
FIG. 11 is an electrical schematic for the distributor of FIG. 9.

The electrical schematic for distributor 189 is shown in FIG. 11. The solenoid wire coils which can be connected to the distributor are represented by the inductance symbols and the microswitches are represented by the switch symbols. The diodes provide the means for dissipating the energy stored in a wire coil when a switch opens.

A 6-cylinder inline engine analog is similar to the 4-cylinder inline engine analog except for requiring 2 additional drivers and a distributor like the one shown in FIGS. 9 and 10 with six microswitches (rather than eight) spaced uniformly around the circular opening 192.

Figure 12:
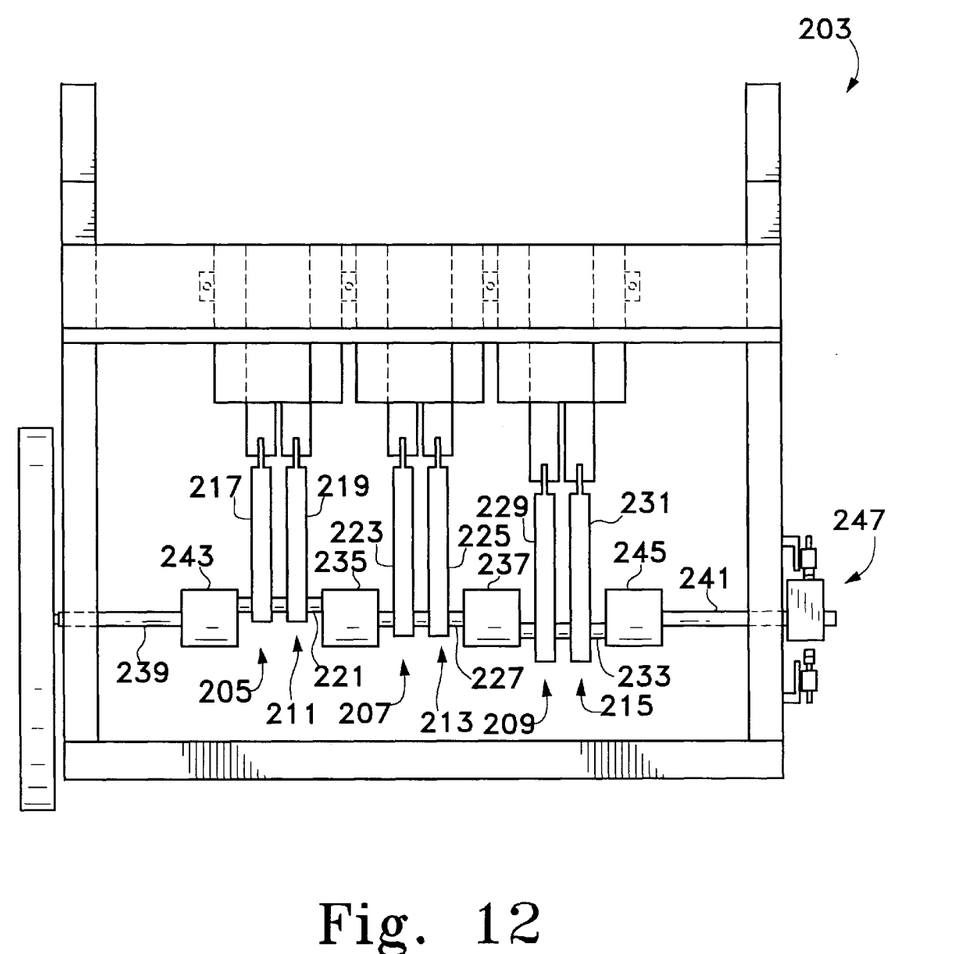
FIG. 12 is a side view of a 6-cylinder V-type internal-combustion engine analog assembled from the internal-combustion engine instructional kit.

A 6-cylinder V-type engine analog 203 consisting of drivers 205, 207, 209 attached to V6 surface 35, FIG. 2, and drivers 211, 213, 215 attached to V6 surface 33, FIG. 2, is shown in FIG. 12. Connecting rods 217, 219 share the same crankpin 221, connecting rods 223, 225 share the same crankpin 227, and connecting rods 229, 231 share the same crankpin 233.

Endpin 239 is connected to crankpin 221 by inserting endpin 239 into center hole 119 and crankpin 221 into reference hole 121 with endpin connector 243 having the orientation of combination connector 115 (FIG. 6) rotated clockwise about center hole 119 by 30 degrees.

Crankpin 221 is connected to crankpin 227 by inserting crankpin 221 into reference hole 121 and crankpin 227 into 120-degree hole 125 with crankpin connector 235 having the orientation of combination connector 115 (FIG. 6) rotated clockwise about center hole 119 by 30 degrees.

Crankpin 227 is connected to crankpin 233 by inserting crankpin 227 into reference hole 121 and crankpin 233 into 120-degree hole 125 with crankpin connector 237 having the orientation of combination connector 115 (FIG. 6) rotated counterclockwise about center hole 119 by 90 degrees.

Crankpin 233 is connected to endpin 241 by inserting crankpin 233 into 120-degree hole 120 and endpin 241 into center hole 119 with endpin connector 245 having the orientation of combination connector 115 (FIG. 6) rotated counterclockwise about center hole 119 by 90 degrees.

The distributor 247 is like the one shown in FIGS. 9 and 10 except for having six rather than eight microswitches mounted at equal angular intervals around the circular opening 192.

An 8-cylinder V-type engine analog is similar in configuration to a 6-cylinder V-type except that the V8 surfaces 29, 31 (FIG. 2) are used instead of the V6 surfaces 33, 35 for mounting the two solenoid supports 11 and the eight-microswitch distributor shown in FIGS. 9 and 10 is used instead of the six-microswitch distributor that is used in the 6-cylinder V-type analog.

A 10-cylinder V-type engine analog is similar in configuration to an 8-cylinder V-type except that the V10 surfaces 28, 30 (FIG. 2) are used instead of the V8 surfaces 29, 31 for mounting the two solenoid supports 11 and the distributor is like the one shown in FIGS. 9 and 10 except for having 10 rather than eight microswitches mounted at equal angular intervals around the circular opening 192.

The reciprocating engine assembly kit described herein includes parts from which engine analogs can be assembled corresponding to internal combustion engines of an arbitrary number of cylinders and a variety of cylinder configurations including inline, opposed, and V-type. The kit as described herein enables the assembly of V-type engine analogs with 3N solenoids positioned along each solenoid support 11 attached to V6 surfaces 33 and 35 (FIG. 2) where N takes on integer values and the normals to the two solenoid supports 11 have an angular displacement of 120 degrees.

The kit also enables the assembly of V-type engine analogs with 4N solenoids positioned along each solenoid support 11 attached to V8 surfaces 29 and 31 (FIG. 2) where the normals to the two solenoid supports 11 have an angular displacement of 90 degrees.

The kit also enables the assembly of V-type engine analogs with 5N solenoids positioned along each solenoid support 11 attached to V10 surfaces 28, 30 (FIG. 2) where the normals to the two solenoid supports 11 have an angular displacement of 72 degrees.

The kit could also be provided with parts that would enable the assembly of radial engine analogs. Such a kit would include regular-polygon-shaped endpin supports 7, 9 (FIGS. 1 and 2) with the number of sides equal to the number of solenoids to be used in the radial engine analog.

The combination of a cylinder, piston, valving, and combustion igniting apparatus in an internal-combustion engine constitutes a reciprocating-motion generator. A connecting rod in combination with a crankpin constrained to rotate about an axis constitutes a reciprocating-to-rotary motion converter that converts the reciprocating motion of the piston into rotary motion of the crankpin.

This invention provides the means for illustrating and understanding the operating principles of internal-combustion engines by providing simple analogs for reciprocating-motion generators and reciprocating-to-rotary motion converters that can be assembled into operating analogs of internal-combustion engines by students. What constitutes "simple" analogs are analogs that can easily and safely be handled by children and teenagers in a living-room environment.

The analog of an internal-combustion engine reciprocating-motion generator presented herein is the combination of a solenoid and plunger which is a particularly simple analog of the reciprocating-motion generators of internal-combustion engines. However, the claims to this invention are intended to include any and all analogs of a reciprocating-motion generator. For example, one might use force generation mechanisms other than those associated with converting the potential energy of a plunger in the magnetic field of a solenoid into plunger kinetic energy. For another example, the potential energy stored in a compressed spring could be converted into kinetic energy of a plunger. For still another possibility, the potential energy of compressed air could be converted into kinetic energy of a plunger.

Still another possible analog of an internal-combustion engine reciprocating-motion generator is an electric motor coupled to a rotary-to-reciprocating motion converter.

The analog of an internal-combustion engine reciprocating-to-rotary motion converter disclosed herein (i.e. connecting rod-crankpin) is almost identical in structure to the reciprocating-to-rotary motion converter typically used in internal-combustion engines. There are numerous mechanisms that convert reciprocating motion to rotary motion that have been described in compendiums of mechanical devices and many of these could serve as analogs of internal-combustion engine reciprocating-to-rotary motion converters.

What is claimed is:

1. Apparatus consisting of a set of parts that can be assembled into a variety of internal-combustion engine analogs, the set of parts comprising:

a set of platform parts that can be assembled into a platform having a platform rotary axis and a platform reference axis normal to the platform rotary axis, a set of driver parts that can be assembled with the set of platform parts into a driver assembly supported by the platform, the driver assembly comprising one or more drivers and at least one driver connector, each driver containing a first driver point and a second driver point, the first driver point traveling back and forth along a driver line segment, the second driver point traveling in a driver circle around a driver-assembly rotary axis as the first driver point travels back and forth along the driver line segment, the orientation of the driver being described by a driver reference axis normal to the driver-assembly rotary axis and parallel to the driver line segment, the driver-assembly rotary axis being collinear with the platform rotary axis, the driver reference axis of each driver being at any one of a plurality of angular positions relative to the platform reference axis, a driver connector enabling two drivers with adjacent driver circles to be connected together, the driver connector length being less than the spacing between adjacent driver circles where the driver connector length is the distance between parallel planes normal to the driver-assembly rotary axis that bound the driver connector.

2. The apparatus of claim 1 wherein a driver comprises: a reciprocating-motion generator that causes the first driver point contained in the reciprocating-motion generator to travel back and forth along the driver line segment, the reciprocating-motion generator being bounded by an attachment surface normal to the driver line segment, the reciprocating-motion generator attaching to the platform with the attachment surface butted up against a platform part.

3. The apparatus of claim 2 wherein the reciprocating-motion generator comprises:
a solenoid having a cavity;
a plunger constrained to move rectilinearly into and out of the cavity of the solenoid, the plunger not passing through an aperture in a platform part.

4. The apparatus of claim 2 wherein the application of power to the reciprocating-motion generator causes the first driver point to travel in one direction along the driver line segment and the removal of power allowing the first driver point to travel in the opposite direction along the driver line segment, the reciprocating-motion generator comprising:
a distributor that applies power to the reciprocating-motion generator while the second driver point is within a specified range on the driver circle, the distributor being located in a region external to the region occupied by the driver assembly.

5. The apparatus of claim 4 wherein the distributor comprises:
a switch for each of one or more reciprocating-motion generators, power being applied to a reciprocating-motion generator when the associated switch is activated, the switches for all of the reciprocating-motion generators being attached to a common mounting plate;
a rotor that revolves through a 360-degree angle as the second driver point of a driver traverses the driver circle, the rotor activating a switch while the second driver point is within a specified range on the driver circle.

6. The apparatus of claim 2 wherein the reciprocating-motion generator comprises:
a power source which supplies power via two conducting wires to the reciprocating-motion generator.

7. The apparatus of claim 1 wherein a driver comprises:
a reciprocating-to-rotary motion converter that causes the second driver point of the driver to travel around the driver circle when the first driver point travels back and forth along the driver line segment, the reciprocating-to-rotary motion generator being bounded by an attachment surface normal to the driver line segment, the reciprocating-to-rotary motion generator attaching to the platform with the attachment surface butted up against a platform part.

8. The apparatus of claim 7 wherein the reciprocating-to-rotary motion converter comprises:
a connecting rod having a first end and a second end, the first end being pivotably attached to the first driver point;
a crankpin that is rotatably attached to the second end of the connecting rod at the second driver point, the crankpin containing the second driver point the crankpin connecting a driver to a driver connector.

9. The apparatus of claim 1 wherein a driver connector has an axis that is collinear with the driver-assembly rotary axis when connecting adjacent drivers in a driver assembly, the driver connector having a plurality of holes with axes parallel to and passing through points on a circle concentric with the axis of the driver connector.

10. The apparatus of claim 9 wherein the cross sections of the holes are polygons.

11. The apparatus of claim 1 wherein the driver assembly comprises:
two endpins, one end of an endpin being attached to the second driver point of a driver in the end position of the driver assembly, the other end of the endpin being rotatably attached to the platform.

12. The apparatus of claim 11 wherein the driver assembly comprises:
two endpin connectors, an endpin connector enabling the connection of an endpin to a driver in the end position of the driver assembly.

13. The apparatus of claim 12 wherein the endpin connector has an axis that is collinear with the driver-assembly rotary axis when attached to an end driver in the driver assembly, the endpin connector having a plurality of holes with axes parallel to and passing through points on a circle concentric with the axis of the endpin connector, the endpin connector having a hole with an axis collinear with the axis of the endpin connector.

14. The apparatus of claim 13 wherein the cross sections of the holes are polygons.

15. The apparatus of claim 11 wherein the driver assembly comprises:
a flywheel that is attachable to the end of an endpin that is rotatably attached to the platform.

16. The apparatus of claim 1 wherein the platform comprises:
a baseplate;
a first endplate that is attachable to the baseplate, the first endplate being normal to the baseplate when the first endplate is attached to the baseplate;
a second endplate that is attachable to the baseplate, the second endplate being normal to the baseplate and parallel to the first endplate when the first and second endplates are attached to the baseplate.

17. The apparatus of claim 16 wherein the platform comprises:
one or more crossplates that are attachable to the first and second endplates when the first and second endplates are attached to the baseplate, one or more drivers being attachable to a cross plate, the one or more drivers being located within the enclosure defined by the baseplate, the first and second endplates, and all lines parallel to the baseplate from the perimeter of the first endplate to the perimeter of the second endplate.

18. The apparatus of claim 17 wherein a driver is attachable to a crossplate with the driver line segment aligned with the normal to the crossplate.

19. The apparatus of claim 17 wherein a crossplate is attachable to the first and second endplates at any one of a plurality of angles, the angle of the crossplate being the angle between the normal to the cross plate and the platform reference axis.

* * * * *